US007975121B2

(12) United States Patent
Chen et al.

(10) Patent No.: US 7,975,121 B2
(45) Date of Patent: Jul. 5, 2011

(54) SIMPLE STACK TYPES

(75) Inventors: Juan Chen, Sammamish, WA (US);
Chris Hawblitzel, Redmond, WA (US);
Frances Perry, Princeton, NJ (US)

(73) Assignee: Microsoft Corporation, Redmond, WA (US)

( * ) Notice: Subject to any disclaimer, the term of this patent is extended or adjusted under 35 U.S.C. 154(b) by 678 days.

(21) Appl. No.: 12/119,151

(22) Filed: May 12, 2008

(65) Prior Publication Data
US 2009/0282208 A1    Nov. 12, 2009

(51) Int. Cl.
*G06F 12/00* (2006.01)
(52) U.S. Cl. ....................................... 711/170
(58) Field of Classification Search .................. None
See application file for complete search history.

(56) References Cited

U.S. PATENT DOCUMENTS 6,072,950 A * 6/2000 Steensgaard .................. 717/126
7,574,700 B2 * 8/2009 Bracha .......................... 717/141

OTHER PUBLICATIONS

Ahmed et al., "The Logical Approach to Stack Typing", ACM SIGPLAN Notices, vol. 38, Issue 3, Mar. 2003, 12 pgs.
Crary, "Toward a Foundational Typed Assembly Language", ACM SIGPLAN Notices, vol. 38, Issue 1, Jan. 2003, 15 pgs.
Crary et al., "Typed Memory Management in a Calculus of Capabilities", Proceedings of 26th ACM SIGPLAN-SIGACT symposium on Principles of Programming Languages, 1999, 14 pgs.
Fluet et al., "Linear Regions Are All You Need", Lecture Notes in Computer Science (LNCS), Programming Languages and Systems, vol. 3924, 2006, 15 pgs.
Girard, "Linear Logic", Theoretical Computer Science, vol. 50, Issue 1, Jan. 1987, 102 pgs.
Ishtiaq et al., "BI as an Assertion Language for Mutable Data Structures", Proceedings 28th ACM-SIGPLAN Symposium on Principles of Programming Lanaguage, Jan. 2001, 13 pgs.
Jia et al., "Certifying Compilation for a Language with Stack Allocation", 20th Annual IEEE Symposium on Logic in Computer Science, 2005, 10 pgs.
Lincoln et al., "Decision Problems for Propositional Linear Logic", 31st Annual Symposium on Foundations of Computer Science, 1990, 10 pgs.
Morrisett et al., "From System F to Typed Assembly Language", ACM Transactions on Programming Languages and Systems, vol. 21, Issue 3, May 1999, 41 pgs.
Morrisett et al., "Stack-Based Typed Assembly Language", Journal of Functional Programming, 2002, vol. 12, 23 pgs.
Necula, "Proof-Carrying Code", ACM Symposium on Principles of Programming Languages, 1997, 14 pgs.

(Continued)

*Primary Examiner* — Hiep T Nguyen
(74) *Attorney, Agent, or Firm* — Lee & Hayes, PLLC

(57) ABSTRACT

Embodiments that facilitate type checking of assembly language instructions are disclosed. In one embodiment, a method includes receiving a low level language instruction in a memory. The instruction includes a word having a first type. The memory includes either a stack or a heap. Each of the stack or heap includes a plurality of positions. The method also includes labeling the plurality of positions in one of the stack or the heap as one or more specified positions and one or more unspecified positions. The method further includes assigning a second type to the memory, the second type including the first type of the word. The word is stored in a specified position or an unspecified position. The method additionally includes determining whether the instruction is well-typed by applying one or more rules to the instruction and to the second type.

20 Claims, 7 Drawing Sheets

OTHER PUBLICATIONS

Reynolds, "Separation Logic: A Logic for Shared Mutable Data Structures", 17th Annual IEEE Symposium on Logic in Computer Science, 2002, 20 pgs.

Smith et al., "Alias Types", Lecture Notes in Computer Science (LNCS), Programming Languages and Systems, vol. 1782, 2000, 16 pgs.

Wadler, "A Taste of Linear Logic", Lecture Notes in Computer Science, Mathematical Foundations of Computers, vol. 711/1993, 21 pgs.

Walker, "Mechanical Reasoning about Low-Level Programming Languages", Lecture Notes, 2001, retrieved from http://www.cs.cmu.edu/dpw/papers.html, 50 pgs.

* cited by examiner

208    $\ell ::= \eta \mid \text{base} \mid \text{next}(\ell) \mid \rho$ 210a    h(int $x$, int $y$){...}

210b    $next(next(\eta)) : \text{int} :: next(\eta) : \text{int} :: \eta : \rho$ 212a    swap (ref int $x$, ref int $y$)

212b    $next(next(\eta)) : \text{Ptr}(\eta_x) :: (next(\eta)) : \text{Ptr}(\eta_y) :: \eta : (\rho \wedge \{\eta_x : \text{int}\} \wedge \{\eta_y : \text{int}\})$

*FIGURE 2B*

SIMPLE STACK TYPES

BACKGROUND

High-level programming languages such as Java, C++, and C# are generally used to produce source codes. These source codes are optimized and compiled by compilers to assembly language code before they are executed on machines. Compilers may contain program errors, which are also known as bugs, which may cause the compilers to compile safe source code to unsafe assembly language code. Programs based on unsafe assembly language code may malfunction and/or cause other programs to malfunction. In some instances, the safety of assembly language code may be verified after compilation by "type checking" mechanisms, provided that the source code is compiled into the assembly language code by a special type of compilers known as "type-preserving" compilers. A "type-preserving" compiler generates the "evidence" needed by the "type-checking" mechanisms by transforming a well-typed source code into a well-typed assembly language code, preserving the types in the intermediate code during each compilation phase between the source code and assembly language code. "Type checking" relies on the premise that a specific type indicates a set of values or expressions that have the same sort of generic meaning or intended purpose.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments for implementing a "type checking" system that enables a compiler to detect program errors during the compilation of a source code into an assembly language code. As used herein, assembly language code refers to any low level language code. Such low level language code may include, but is not limited to, intermediate code, bytecode, typed assembly language (TAL) code, and the like. For example, a compiler may transform a source code into an assembly language with stack and/or heap operations. Accordingly, the embodiments described herein may enable a type checker function of a compiler to perform "type checking" on stack and/or heap operations. In other words, the type checker function may perform "type checking" during compilation by the compiler.

In one embodiment, a method includes receiving a low level language instruction in a memory. The instruction includes a word having a first type. The memory includes either a stack or a heap. Each of the stack or heap includes a plurality of positions. The method also includes labeling the plurality of positions in one of the stack or the heap as one or more specified positions and one or more unspecified positions. The method further includes assigning a second type to the memory, the second type including the first type of the word. The word is stored in a specified position or an unspecified position. The method additionally includes determining whether the instruction is well-typed by applying one or more rules to the instruction and to the second type. Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIGS. 2A and 2B illustrate an exemplary notation system for implementing type checking during the compilation of a source code into a type checked assembly language code, in accordance with various embodiments for implementing simple stack types (SST).

DETAILED DESCRIPTION

This disclosure is directed to embodiments that enable type checking of assembly language code compiled from source code by a compiler. Assembly language code typically performs stack operations. A stack may be described as a "container" of sequential locations in a memory, wherein each location is capable of storing a data item. The data item may also be referred to as a "word." During operation, data items are added and removed from the stack on a "first in first out" (FIFO) basis. In other words, data items may be added one at a time into each location of the stack. The data items may be thought of as being "stacked" one on top of the other so that the last data item added, that is, "allocated" to the stack is always the first to be removed, that is, "deallocated" from the stack. Furthermore, the stack may also include a stack pointer, such as hardware register, that points to the most recently referenced location on the stack. Accordingly, as data items are added or removed from the stack, the stack point may be displaced to indicate the current extent of the stack.

The embodiments described herein are directed to implementation mechanisms for a type system that enables a "type checker" to perform "type checking" functions on the stack operations. For example, the type system may include logical operation rules. The logical operation rules may be implemented by the type checker to perform the "type checking" functions. The logical operation rules may include operand typing rules, stack rules, stack implication rules, lookup rules, heap rules, and instruction typing rules. Accordingly, various examples of the logical operation rules, as well as "type checking" mechanisms that implement these logical operation rules, are described below with reference to FIGS. 1-6.

Exemplary Scheme

Figure 1:
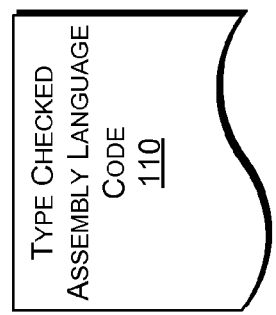
FIG. 1 is a block diagram illustrating an exemplary scheme for implementing type checking during the compilation of a source code into a type checked assembly language code, in accordance with various embodiments for implementing simple stack types (SST).
Figure 1:
Figure 1:
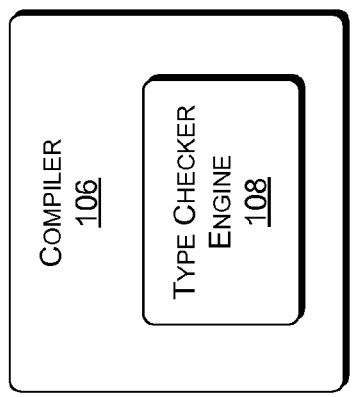
Figure 1:
Figure 1:
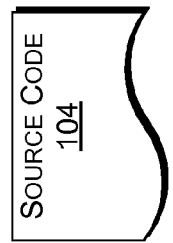
Figure 1:
Figure 1:
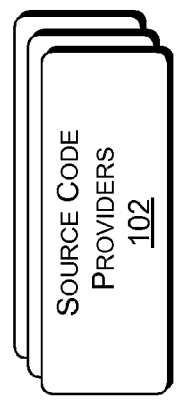

FIG. 1 illustrates an exemplary scheme for implementing type checking during the compilation of a source code into a type checked assembly language code, in accordance with various embodiments for implementing simple stack types (SST). Initially, one or more source code providers 102 may provide source code 104. The source code providers 102 may include programmers that create or modify computer software. Accordingly, the source code 104 may be a newly created source code or a modified source code. The source code 104 may be sent to a compiler 106 for compilation into an assembly language. The compiler 106 may include a type checking engine 108 that is configured to type check an assembly language code derived from the source code 104 during the compilation of the source code 104 by the compiler 106. As further described below, the type checking engine 108 may implement a type system that includes logical operation rules to perform the type checking. Through the operation of the type checker engine 108, the compiler 106 may produce type checked assembly language code 110. It will be appreciated that while the type checking engine 108 may be an integral part of the compiler 106, the type checking engine 108 may also function as a stand alone mechanism that is independent of the compiler 106. Accordingly, in some instances, the type checking engine 108 may be configured to type the assembly language code after compilation.

Simple Stack Type (SST) System

A type system defines how a programming language classifies values and expressions into types. Additionally, a type system also governs the manipulation of those types by the programming language, as well as the interactions between the types and the programming language.

Embodiments described herein are direct to a type system, also referred to as Simple Stack Type (SST), which enables a "type checker" to perform "type checking" functions on the stack operations. In order to accomplish this task, the type system described herein supports identifying "specified" (labeled) locations and "unspecified" (unlabeled) locations for one or more data items in a stack. For example, SST may represent that two integers are present at the top of the stack, but all locations deeper in the stack may be unspecified. It will be appreciated that the stack type representation in the type system for stack operations, as further described in the various embodiments below, is in Backus Naur Form (BNF) notation. Accordingly, in the example describe above, the representation described above may be written as "int∷int∷ρ" using BNF notation, which represents that two integers are present at the top of the stack, but all types deeper in the stack are abstracted by ρ, which represents stack type variables. In various instances, SST is generally implemented into an assembly language that supports types. SST is further described below.

Simple Stack Type (SST) Implementation

SST splits a pointer type into two parts: the location l of the data, and the type of the data at location l. Additionally, a pointer to the data has a singleton type Ptr(l), which indicates that the pointer points exactly to the location l, but does not specify the type of the data at location l. Instead, a separate capability specifies the current type at l. For example, the capability {l↦int} represents that l holds an integer. Because of the separation between singleton pointer types and capabilities, the capabilities can evolve, independently of the pointer types, to track updates and deallocation.

To ensure that no two capabilities specify contradictory information about a single location, SST imposes a linearity discipline on the treatment of capabilities, prohibiting arbitrary duplication of the information contained in a capability. Accordingly, the type system in accordance with various embodiments uses operators and rules that include elements of standard linear logic and separation logic to form a "decidable logic."

Thus, the type system in accordance with the embodiments may incorporate the singleton pointers and the elements from standard linear logic and separation logic to represent "stack type". Linear logic and separation logic share a core of basic operators. Two are of particular interest for stacks: multiplicative conjunction "⊗" (written as "*" in separation logic) and additive conjunction "&" (written as "∧" in separation logic). For instance, to have "coffee⊗tea" is to have both coffee and tea. However, to have "coffee&tea" is to have a choice between coffee and tea, but not both. For example, the stack type int∷int∷ρ may be represented in linear logic notation as $\{l_1 \mapsto int\} \otimes \{l_2 \mapsto int\} \otimes \rho$, where $l_1$ and $l_2$ are the locations of each of the two integers on the stack. Each integer on the stack has a capability $\{l_1 \mapsto int\}$. The ⊗operator would glue capabilities together to form a complete stack capability: The type system in accordance with the embodiments advantageously improves on these notations. First, for the purpose of simplifying the type checking algorithm, the type system replaces the commutative, associative operator ⊗ with the non-commutative, non-associative ∷ operator, resulting in a stack capability $\{l_1 \mapsto int\} \∷ \{l_2 \mapsto int\} \∷ \rho$. Second, rather than showing one location per stack slot, the notation of the type system puts stack slots in between locations, thus $l_1\!:\!int\∷l_2\!:\!int\∷l_0\!:\!\rho$ indicate that one integer falls between locations $l_1$ and $l_2$, and the other falls between locations $l_2$ and $l_0$. These improvements add the extra location $l_0$ to the representation. For instance, the stack pointer may have type $Ptr(l_1)$, pointing to the top of the stack when a frame pointer has type $Ptr(l_0)$ pointing to the bottom of the frame.

Further, the ∧ operator indicates aliasing. Accordingly, the stack type $\sigma \wedge \{l\!:\!\tau\}$ indicates three things. First, σ is a valid stack that holds stack items (words). Second, the location l resides either in the heap or in the part of the stack described by σ. Third, l currently contains a data item (word) of type τ.

Figure 2A:
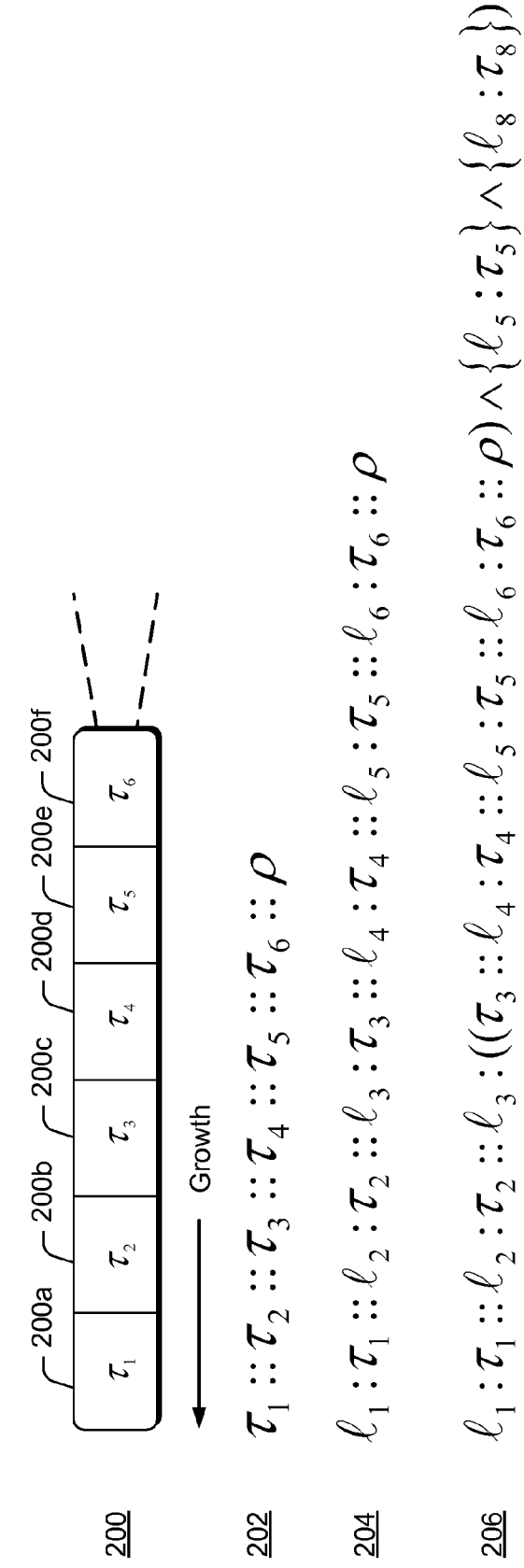

Accordingly, SST may use labeled stack types ς and unlabeled stack types σ (where τ indicates a single-word type, such as int), as further described with respect to FIGS. 2A and 2B:

$$\text{Labeled stack type } \varsigma ::= l\!:\!\sigma \quad (1)$$

$$\text{Unlabeled stack type } \sigma ::= \rho | EMPTY | \tau\∷\varsigma \sigma \wedge \{l\!:\!\tau\} \quad (2)$$

Wherein the "|" notation indicates alternative choices, ρ represents unlabeled stack type variables, "EMPTY" represents empty stacks, τ represents the type for a particular location, and ∷ is the stack concatenation operator. The notation τ∷ς represents that a data item of a type τ is being "pushed" onto the stack ς. The $\sigma \wedge \{l\!:\!\tau\}$ notation represents that somewhere in the stack, there is a data item (word) with the type τ, but the exact location of the data item with the type τ is unknown.

FIGS. 2A and 2B further illustrate an exemplary notation system for implementing simple stack types (SST). A stack 200 may be represented using the notation system in accordance with various embodiments. The stack 200 may include one or more data items (words). For example, the stack 200 may include exemplary data items 200a, 200b, 200c, 200d, 200e, and 200f. The stack 200 may "grow" as additional data items are pushed, that is, "allocated" to the stack. For the purpose of the embodiments, each data item in 200 has a data type, represented by the τ notation. For example, the type of data item 200a is represented by the notation $\tau_1$, and the type of data item 200b is represented by the notation $\tau_2$, and so on and so forth. Representation 202 shows an expression of the stack 200 without location notations. As shown, the type of each of the data items 200 is represented by a τ notation. Further, the type of each data item also separated by the "::", that is, the "double colon" notation. However, since there may be additional data items other than the exemplary data items 200, the ρ notation is used to represent the types of unknown data items in the stack.

The representation 204 illustrates the stack type of 200 with location notions. The location notation l represents a location in the stack. Accordingly, the pairing of the type τ with the location notation l provides the location of data item of type τ in the stack. In one instance of SST, each data item of a specific type in the stack may be assigned a location as soon as it is "pushed" onto the stack 200. As shown in representation 204, each data item of a specific type τ is represented by a location l, as indicated by the ":" (colon) notation. For example, as shown in representation 204, the data item with the type $\tau_1$ is located in the location $l_1$, the data item with the type $\tau_2$ is located in the location $l_2$, and so on and so forth.

Representation 206 adds aliasing notations to 204. As shown in representation 206, each data item of a specific type τ, e.g., $\tau_1$, is paired with a location l, e.g., $l_1$. Additionally, $\{l_5:\tau_5\}$ represents the fact that the data item with type $\tau_5$ resides at location $l_5$. Likewise, $\{l_8:\tau_8\}$ represents the fact that the data item with type $\tau_8$ resides at location $l_8$, but the location $l_8$ is in the portion $l_3:\tau_3::l_4:\tau_4::l_5:\tau_5::l_6:\tau_6::\rho$ of the stack $\varsigma$. For example, such an instance for $l_8$ may occur when a first method may provide the location $l_8$ to a second method where the second method does not know the location $l_8$.

As shown in FIG. 2B, the location notation l, as used in the type system, may be further expanded. For example, an location $l_x$ that corresponds to the base, or the first slot of a stack $\varsigma$, may be written as "$l_x$=base". Likewise, an location $l_y$, or a slot that is directly adjacent to location $l_x$, may be written as $l_y$=next($l_x$). However, while some locations may be represented by specific location such as "base", most methods are configured to run without knowledge of the actual locations of the stack. Accordingly, representation 208 illustrates an unspecified location, as represented by the notation η. In other words, the notation η represents a location that is present in the stack, but not precisely specified. Representation 208 also illustrates a location l that references a heap location with the use of a heap pointer ρ. In general, it will be appreciated that the notation illustrated above are also applicable to a heap data structure in a memory.

The application of the notation system described above is also illustrated in FIG. 2B. As shown in representation 210a, an exemplary function "h" takes two integer parameters, such as "int x" and "int y". The parameters "int x" and "int y" may be stored in a stack, such as stack $\varsigma$. Thus, when the function "h" is called, the structure of the stack may be represented by representation 210b. The function "h" may declare "int::int::ρ", or that it needs a first integer (e.g., "int x"), a second integer (e.g., "int y"), and one or more other words of unspecified locations from the stack, as represent by ρ. Using the η notation, the unspecified location of the one or more words may be represented, as demonstrated by the part η:ρ. Further, one of the integers in the stack may be represented as being stored at location next(η), indicating a location that is relative to, that is, "next" to the location represented by the notation η. Similarly, the other integer in the stack may be represented as having a location of next(next(η)). The next (next(η)) representation indicates a location that is "next" to the next(η) location.

Representation 212a shows an exemplary swap function "swap." The exemplary "swap" function takes references to integers rather than integers, as indicated by "ref int x", and "ref int y," so that changes to x and y in "swap" will be visible when "swap" returns to a caller function. When the function "swap" is called, the structure of the stack may be represented by representation 212b. As shown, the "ref int y" may be stored as a reference pointer, or Ptr($\eta_y$) at a location in the stack next(η). Likewise, the "ref int x" may be stored as a reference pointer, or Ptr($\eta_x$) at a location in the stack next (next(η)). Additionally, in order to use the pointers Ptr($\eta_y$) and Ptr($\eta_x$), a method needs to know that an integer is stored at $\eta_y$, and another integer is stored at $\eta_x$. Thus, because the integers are generally located in ρ, the notation η:(ρ∧{$\eta_x$:int}∧{$\eta_y$:int}) indicates that an integer is located somewhere in ρ at a location $\eta_x$, and another integer is located somewhere in ρ at a location $\eta_y$. Accordingly, representation 212b represents information that enables a method to find an address at an stack slot referenced by Ptr($\eta_x$), and de-reference that address to find the integer stored at $\eta_x$, as indicated in {$\eta_x$:int}. Similarly, a method may find the integer stored at $\eta_y$, as indicated in {$\eta_y$:int}, by finding an address at an stack slot referenced by Ptr($\eta_y$) and de-referencing that address.

Returning to FIG. 1, a stack representation may be manipulated using a set of logic stack implication rules. These stack implication rules, as show below, may enable a type checker mechanism, such as type checker engine 108, to manipulate the stack types:

s-imp-eq $$\overline{\varsigma \Rightarrow \varsigma} \quad (3)$$

s-imp-concat $$\frac{\varsigma \Rightarrow \varsigma'}{l:\tau::\varsigma \Rightarrow l:\tau::\varsigma'} \quad (4)$$

s-imp-alias $$\frac{l:\sigma \Rightarrow l:\sigma'}{l:(\sigma \wedge \{l_t:\tau\}) \Rightarrow l:(\sigma' \wedge \{l_t:\tau\})} \quad (5)$$

s-imp-trans $$\frac{\varsigma_1 \Rightarrow \varsigma_2 \quad \varsigma_2 \Rightarrow \varsigma_3}{\varsigma_1 \Rightarrow \varsigma_3} \quad (6)$$

s-imp-add-alias $$\overline{l:(\tau::\varsigma) \Rightarrow l:(\tau::\varsigma \wedge \{l:\tau\})} \quad (7)$$

s-imp-drop-alias $$\overline{l:(\sigma::\varsigma \wedge \{l:\tau\}) \Rightarrow l:\sigma} \quad (8)$$

s-imp-expand-alias $$\overline{l:(\tau_1::l_q:(\sigma \wedge \{l_2:\tau_2\})) \Rightarrow l:((\tau_1::l_q:\sigma) \wedge \{l_2:\tau_2\})} \quad (9)$$

s-imp-merge-alias $$\frac{\varsigma \Rightarrow l:(\sigma \wedge \{l_1:\tau_1\}) \varsigma \Rightarrow l:(\sigma \wedge \{l_2:\tau_2\})}{\varsigma \Rightarrow l:(\sigma \wedge \{l_1:\tau_1\} \wedge \{l_2:\tau_2\})} \quad (10)$$

As shown, "$\varsigma \Rightarrow \varsigma$" means that if $\varsigma$ holds, then $\varsigma$ also holds. Some of the rules, such as "s-imp-concat", "s-imp-alias", "s-imp-eq", and "s-imp-trans" are basic structural rules. The "s-imp-add-alias" and "s-imp-merge-alias" rules may enable a program, such as a compiler or a type checker, to add one or more aliases to a stack type. Conversely, the "s-imp-drop-alias" rule lets a program drop unneeded aliases.

Further, the "s-imp-expand-alias" rule expands the scope of an alias. For example, for the swap function:

```
void f( ) {
    int a = 10, b = 20;
    swap(ref a, ref b); }
void g( ) {
    int c = 30;
    swap(ref c, ref c); }
void swap(ref int x, ref int y) {
    int t = x;
    x = y;
    y = t; }
```

The compiler may push arguments to swap onto the stack from right-to-left, and stores the return address in a register.

Upon entry to swap, the stack will hold the arguments x and y, each of which is a pointer to some location inside ρ, so that:

$$l_2:Ptr(l_x) :: l_1:Ptr(l_y) :: l_0:(\rho \wedge \{l_x:int\} \wedge \{l_y:int\}) \quad (11)$$

The locations $l_x$ and $l_y$ may appear anywhere in ρ, in any order. In some instances, $l_x$ and $l_y$ may be the same location. For example, suppose that just before calling swap, the stack has type $l_0$:int $\therefore$ A program, such as a type checker, may apply the "s-imp-add-alias" and "s-imp-merge-alias" rules and obtain:

$$l_0:int :: \varsigma \Rightarrow l_0:((int :: \varsigma) \wedge \{l_0:int\} :: \{l_0:int\}) \quad (12)$$

Using this relationship, the program can choose ρ=(int:: ς), as well as choose $l_x=l_y$, push two pointers to $l_0$ onto the stack, and call swap. In another instance, the stack implication rules may also be used to reorder aliases. For example, a program may implement the "s-imp-drop-alias", "s-imp-alias", and "s-imp-merge-alias" rules to obtain:

$$l_0:(\rho \wedge \{l_y:int\} \wedge \{l_x:int\}) \Rightarrow l_0:(\rho \wedge \{l_x:int\} \wedge \{l_y:int\}) \quad (13)$$

In various instances, the syntax σ∧{l:τ} expresses a clear scope in which l remains safe to use: l definitely contains type τ as long as σ remains unmodified. Accordingly, if the program deallocates a data item from σ, for example, then the alias {l:τ} is generally discarded. Thus, the scope is governed by the fact that "s-imp-expand-alias" expands the scope of an alias, but a logical implication rule to contract the scope is not implemented.

Formalization

The type system in accordance with the various embodiments may be formalized for execution by a type checking mechanism, such as the type checker of a compiler. First, a type system may support at least integer type "int", nonsense type "Nonsense" for uninitialized stack slots, heap pointer type "HeapPtr(τ)" for pointers to heap values of type τ, singleton type "Ptr(τ)", and code type "∀[Δ](Γ, ς)". Accordingly, the exemplary types supported by the type system may be summarized as follows:

$$\text{type } \tau ::= int | Nonsense | HeapPtr(\tau) | Ptr(l) | \forall[\Delta](\Gamma, \varsigma) \quad (14)$$

The type "∀[Δ](Γ, ς)" describes preconditions for code blocks. The location environment Δ is a sequence of location variables and stack type variables. The register file Γ is a partial function from registers to types. Γ and ς describe the initial register and stack states for the blocks. They may refer to the variables in Δ.

Second, the formalized type system also includes a plurality of standardized values and operands. These values and operands may include the stack location d, which refers to either a "base" stack location or the next stack location "next (d)". A word-sized value w may be an integer "i", the "nonsense" value for uninitialized stack slots, a heap location "p", a stack location "d", or instantiated values "w[l]" and "w[σ]" where w points to code blocks polymorphic over location variables and stack type variables. Contents of registers and stack slots are word-sized. Moreover, word-sized values may be separated from operands to prevent registers from containing registers. An operand o may be a register "r", a word-sized value "w", or instantiated operands "o[l]" and "o[σ]". A special register sp is used for the stack pointer. Accordingly, the exemplary stack location, word value, and operand values may be summarized as follows:

$$\text{stack loc } d ::= base | next(d) \quad (15)$$

$$\text{word value } w ::= nonsense | p | d | w[l] | w[\sigma] \quad (16)$$

$$\text{operand } o ::= r | w | o[l] | o[\sigma] \quad (17)$$

Third, the type system in accordance with various embodiments may be used to type check standard instructions, such as "mov" and "add" instructions. However, in some instances, specialized instructions are needed in order to access the stack or the heap. For example, values on a heap or a stack are accessed through explicit load and store instructions. Moreover, "ladd" instructions are used for stack location arithmetic. In a "ladd" instruction "ladd r, i", the first operand r points to a stack location, and the second operand i is a constant integer (positive or negative). A "ladd" instruction moves the stack pointer along the stack according to the integer value. In contrast, standard add and subtract instructions deal with only integer arithmetic. The heap allocation instruction "heapalloc r=(o)" allocates a word on the heap with initial value o and assigns the new heap location to r. The unpack instruction "(η, r)=unpack(o)" coerces a heap pointer o to a heap location. Moreover, the instruction also introduces a fresh location variable η for o and assigns η to r. Accordingly, these instructions may be summarized as follows:

$$\text{instr ins} ::= mov\ r,o | ladd\ r,o | sub\ r,o | ladd\ r,i | load$$
$$r_1,[r_2+i] | store\ [r_1+i],r_2 | jumpif0\ r,o |$$
$$\text{heapalloc } r = (o) | (\eta,r) = unpack(o) \quad (18)$$

Fourth, in order to implement the type system in accordance the various embodiments, a plurality of environments are maintained by the type checker. In addition to the location environment Δ and the register file Γ, the type checker may also maintain the heap environment Ψ. The heap environment Ψ is a partial function from heap locations to heap pointer types.

Typing Rules

In various embodiments, the type system may include operand typing rules as shown below. In these operand typing rules, the rule Δ; Ψ; Γ⊢o:τ means that operand o has type r under the environments. The heap location may be presented in two ways: the type in the heap environment (o-p-H) or a singleton type (o-p), as shown below in (23) and (24). A stack location has a singleton type (o-d), as shown below in (22):

$$\text{o-reg } \overline{\Delta;\Psi;\Gamma \vdash r:\Gamma(r)} \quad (19)$$

$$\text{o-int } \overline{\Delta;\Psi;\Gamma \vdash i:int} \quad (20)$$

$$\text{o-ns } \overline{\Delta;\Psi;\Gamma \vdash nonsense:Nonsense} \quad (21)$$

$$\text{o-d } \overline{\Delta;\Psi;\Gamma \vdash d:Ptr(d)} \quad (22)$$

$$\text{o-p-H } \overline{\Delta;\Psi;\Gamma \vdash p:\Psi(p)} \quad (23)$$

$$\text{o-p } \overline{\Delta;\Psi;\Gamma \vdash p:Ptr(p)} \quad (24)$$

If an operand o has a polymorphic type ∀[Δ](Γ, ς), o[l] and o[σ] instantiate the first variable in Δ with l and σ respectively. The rules Δ⊢l and Δ⊢σ mean that l and a are well-formed under Δ respectively, as shown below:

$$\text{o-inst-1} \quad \frac{\Delta;\Psi;\Gamma \vdash o:\forall[\eta,\Delta'](\Gamma',\varsigma) \Delta \vdash l}{\Delta;\Psi;\Gamma \vdash o[l]:\forall[\Delta']\left(\Gamma'\left[\frac{l}{\eta}\right], s\left[\frac{l}{\eta}\right]\right)} \quad (25)$$

$$\text{o-inst-Q} \quad \frac{\Delta;\Psi;\Gamma \vdash o:\forall[\rho,\Delta'](\Gamma',\varsigma) \Delta \vdash \sigma}{\Delta;\Psi;\Gamma \vdash o[\sigma]:\forall[\Delta']\left(\Gamma'\left[\frac{\sigma}{\rho}\right], s\left[\frac{\sigma}{\rho}\right]\right)} \quad (26)$$

The rule ⊢(Γ, ς){r←τ}(Γ', ς') means that assigning a value of type τ to register r results in new environments Γ' and ς'. Only Γ is changed if r is not sp. Otherwise, the stack grows or shrinks according to the new value of sp, as shown below:

$$\text{a-not-esp} \quad \frac{r \neq sp \ \Gamma' = \Gamma[r \mapsto \tau]}{\vdash (\Gamma, \varsigma)\{r \leftarrow \tau\}(\Gamma', \varsigma)} \quad (27)$$

$$\text{a-esp} \quad \frac{\vdash \text{Resize}(l, \varsigma) = \varsigma' \ \Gamma' = \Gamma[sp \mapsto Ptr(l)]}{\vdash (\Gamma, \varsigma)\{sp \leftarrow Ptr(l)\}(\Gamma', \varsigma')} \quad (28)$$

Moreover, the type system may also include stack rules that resize the stack. For instance, when the stack grows or shrinks, the type system in accordance with the embodiments may implement the judgment $\vdash \text{Resize}(l, \varsigma) = \varsigma'$ to get the new stack type. The judgment means that resizing stack $\varsigma$ to l location results in stack $\varsigma'$. The location l will be the top of $\varsigma'$. Accordingly, the stack shrinks if l is inside $\varsigma$ (s-shrink) and grows if l is beyond the top of $\varsigma$ (s-grow). The stack drops all aliases beyond l when shrinking to avoid dangling pointers, as shown below:

$$\text{s-shrink} \quad \frac{\varsigma \Rightarrow \vec{r} @ (l:\sigma)}{\vdash \text{Resize}(l, \varsigma) = l:\sigma} \quad (29)$$

$$\text{s-grow} \quad \frac{\varsigma' = (Nonsense_n; \ldots; Nonsense_1) @ (l:\sigma)}{\vdash \text{Resize}(\text{Next}^n(l), l:\sigma) = \varsigma'} \quad (30)$$

Further, the type system may also include stack rules that enable location lookup in the stack. The rule $\varsigma \vdash l + i = l'$ means that in stack $\varsigma$ going i slots from location l leads to location l'. For example, a positive i means going toward the stack top and negative means toward the stack bottom. The notion n represents natural numbers. (The requirement $\varsigma \Rightarrow \vec{r}@(l:\sigma)$ ensures that l is a stack location, not a heap location), as shown below:

$$\text{s-offset-next} \quad \frac{\varsigma \Rightarrow \vec{r} @ (l:\sigma)}{\varsigma \vdash l + n = next^n(l)} \quad (31)$$

$$\text{s-offset-prev} \quad \frac{\varsigma \Rightarrow \vec{r} @ (l:\sigma)}{\varsigma \vdash next^n(l) + (-n) = l} \quad (32)$$

Moreover, the rule $\varsigma \vdash l:\tau$ means that the location l in stack $\varsigma$ has type $\tau$. The location l can be either an alias in $\varsigma$, or be on the spine of $\varsigma$ (the stack type obtained by dropping all aliases from $\varsigma$.

$$\text{s-lookup} \quad \frac{\varsigma \Rightarrow l':(\sigma \wedge \{l:\tau\})}{\varsigma \vdash l:\tau} \quad (33)$$

Additionally, the rule $\varsigma \vdash l \leftarrow \tau \vdash \varsigma$ means that updating the location l in stack $\varsigma$ with type $\tau$ results in stack $\varsigma'$. As used throughout, the "$\vdash$" notation may be interpreted to mean "leading to." Weak updates do not change the stack type (s-update-weak). Strong updates change the type of l and drop all aliases beyond l because they may refer to the old type of l (s-update-strong), as shown below:

$$\text{s-update-weak} \quad \frac{\varsigma \vdash l:\tau}{\varsigma \vdash l \leftarrow \tau \square \succ \varsigma} \quad (34)$$

$$\text{s-update-strong} \quad \frac{\varsigma \Rightarrow \vec{r} @ (l:\tau::\varsigma')}{\varsigma \vdash l \leftarrow \tau' \square \succ \vec{r} @ (l:\tau'::\varsigma')} \quad (35)$$

The type system may further include instruction typing rules. The instruction typing rules enable a type checker to verify that a particular instruction does not adversely affect the types of words stored in a stack or a heap. Additionally, the instruction typing rules may also ensure that the instructions are "type safe," that is, they will not cause type errors during execution. Instruction typing rules according to various embodiments are listed below:

$$\text{i-mov} \quad \frac{\Delta; \Psi; \Gamma \vdash o:\tau \vdash (\Gamma, \varsigma)\{r \leftarrow \tau\}(\Gamma', \varsigma')}{\Delta; \Psi \vdash (\Gamma; \varsigma)\{\text{move } r, o\}(\Gamma'; \varsigma')} \quad (36)$$

$$\text{i-add} \quad \frac{\Delta; \Psi; \Gamma \vdash o:\text{int } r \neq sp\Gamma(r) = \text{int}}{\Delta; \Psi \vdash (\Gamma; \varsigma)\{\text{add } r, o\}(\Gamma; \varsigma)} \quad (37)$$

$$\text{i-sub} \quad \frac{\Delta; \Psi; \Gamma \vdash o:\text{int } r \neq sp\Gamma(r) = \text{int}}{\Delta; \Psi \vdash (\Gamma; \varsigma)\{\text{sub } r, o\}(\Gamma; \varsigma)} \quad (38)$$

$$\text{i-ladd} \quad \frac{\Gamma(r) = Ptr(l)\varsigma \vdash l + i = l' \vdash (\Gamma, \varsigma)\{r \leftarrow Ptr(l')\}(\Gamma', \varsigma')}{\Delta; \Psi \vdash (\Gamma; \varsigma)\{\text{ladd } r, -4*i\}(\Gamma'; \varsigma')} \quad (39)$$

$$\text{i-load-p} \quad \frac{\Gamma(r_2) = HeapPtr(\tau) \vdash (\Gamma, \varsigma)\{r_1 \leftarrow \tau\}(\Gamma', \varsigma')}{\Delta; \Psi \vdash (\Gamma; \varsigma)\{\text{load } r_1, [r_2 + 0]\}(\Gamma'; \varsigma')} \quad (40)$$

$$\text{i-store-p} \quad \frac{\Gamma(r_2) = \tau \ \Gamma(r_1) = HeapPtr(\tau)}{\Delta; \Psi \vdash (\Gamma; \varsigma)\{\text{store}[r_1 + 0], r_2\}(\Gamma; \varsigma)} \quad (41)$$

$$\text{i-load-concat} \quad \frac{\Gamma(r_2) = Ptr(l)\varsigma \vdash l + i = l'\varsigma \vdash l':\tau \vdash (\Gamma,\varsigma)\{r_1 \leftarrow \tau\}(\Gamma',\varsigma')}{\Delta; \Psi \vdash (\Gamma; \varsigma)\{\text{load } r_1, [r_1 + (-4*i)]\}(\Gamma'; \varsigma')} \quad (42)$$

$$\text{i-store-concat} \quad \frac{\Gamma(r_1) = Ptr(l)\Gamma(r_2) = \tau\varsigma \vdash l + i = l'\varsigma \vdash l' \leftarrow \tau \square \succ \varsigma'}{\Delta; \Psi \vdash (\Gamma; \varsigma)\{\text{store}[r_1 + (-4*i)], r_2\}(\Gamma; \varsigma')} \quad (43)$$

$$\text{i-load-aliased} \quad \frac{\Gamma(r_2) = Ptr(l)\varsigma \vdash l:\tau \vdash (\Gamma, \varsigma)\{r_1 \leftarrow \tau\}(\Gamma', \varsigma')}{\Delta; \Psi \vdash (\Gamma; \varsigma)\{\text{load } r_1, [r_2 + 0]\}(\Gamma'; \varsigma')} \quad (44)$$

$$\text{i-store-aliased} \quad \frac{\Gamma(r_1) = Ptr(l)\varsigma \vdash l:\tau \ \Gamma(r_2) = \tau}{\Delta; \Psi \vdash (\Gamma; \varsigma)\{\text{store}[r_1 + 0], r_2\}(\Gamma; \varsigma)} \quad (45)$$

$$\text{i-heapalloc} \quad \frac{\Delta; \Psi; \Gamma \vdash o:\tau \vdash (\Gamma, \varsigma)\{r \leftarrow HeapPtr(\tau)\}(\Gamma', \varsigma')}{\Delta; \Psi \vdash (\Gamma; \varsigma)\{\text{heapalloc } r = \langle o \rangle\}(\Gamma'; \varsigma')} \quad (46)$$

$$\text{i-jump0} \quad \frac{\Gamma(r) = \text{int}\Delta; \Psi; \Gamma \vdash o:\forall \ [\,](\Gamma', \varsigma')\Gamma \Rightarrow \Gamma'\varsigma \Rightarrow \varsigma'}{\Delta; \Psi \vdash (\Gamma; \varsigma)\{\text{jumpif0 } r, o\}(\Gamma; \varsigma)} \quad (47)$$

As shown, each instruction typing rule includes an instruction portion that is below a line, and a requirement portion that is above the line. The instruction portion of each rule follows the general form $\Delta;\Psi \vdash (\Gamma,\varsigma)\{\text{ins}\}(\Gamma'\varsigma)$. The form $\Delta; \Psi \vdash (\Gamma,\varsigma)\{\text{ins}\}(\Gamma'\varsigma)$ means that checking the instruction "ins" changes the environments $\Gamma$ and $\varsigma$ to new environments $\Gamma'$ and $\varsigma'$. An instruction checked by each corresponding instruction typing rule is considered to be well-typed if the instruction, as shown in the instruction portion, satisfies the one or more criteria set in the requirement portion.

For example, with respect to the rule i-add (37), the $\{\text{add } r, o\}$ portion indicates addition of two integers r and o. The requirement portion (above the line) indicates that there are three criteria that the instruction need to satisfy to be considered well-typed. First, the requirement $\Gamma \vdash o:\text{int}$ indicates that o must have the type int, that is, o must be an integer. The second requirement $r \neq sp$ indicates that the stack pointer "sp" should be not be used for the integer r. Thirdly, the requirement $\Gamma(r) = \text{int}$ indicates that r must also have the type int, that is, r must also be an integer. Thus, a type checker may determine that the $\{\text{add } r, o\}$ instruction is valid if all the requirements are satisfied.

In another example, the rule i-load-aliased (44) checks an instruction that loads a word at a memory address stored in $r_2$ into a register $r_1$, that is, {load $r_1$,[$r_2$+0]}. In order to do so, the requirement portion of the rule verifies that $r_2$ is a valid address and that the address contains a word of a valid type, and determines the type for the word. This rule is designed to be applied to the loading of words that are stored on the stack or on the heap. The $\sigma(r_2)=\text{Ptr}(l)$ portion verifies that $r_2$ has a pointer type to location l. The $\varsigma \vdash l:\tau$ portion verifies that the location l is in the stack $\varsigma$ and has some type represented by $\tau$. The $(\Gamma,\varsigma)\{r_1 \leftarrow \tau\}(\Gamma';\varsigma)$ portion indicates that once $r_2$ is verified to have a valid type, the word in the memory address $r_2$ may be moved into a register $r_1$ provided that the old environment, as represented by $(\Gamma,\varsigma)$, is updated to the new environment represented by $(\Gamma';\varsigma)$. Accordingly, the type checker may use the requirement portion of the i-load-aliased (44) rule to check the validity of the {load $r_1$,[$r_2$+0]} instruction.

Additionally, in the rule i-ladd (37), the location arithmetic instruction "ladd r, i" requires that r point to a location l and i be a multiple of 4. The stack grows toward lower addresses. If i is negative, the result location is further outward from l. Further, load and store can operate on heap locations (i-load-p (40) and i-store-p (41)), stack locations on the spine (i-load-concat (42) and i-storeconcat (43)), and aliases (i-load-aliased (44)) and i-store-aliased (45)). The type system in accordance with the embodiments also supports weak updates on heap locations and aliases, and both strong and weak updates on stack locations on the spine.

The rule for heap allocation, i-store-heapalloc (46) assigns a heap pointer type to the register that holds the pointer, instead of a singleton type, because the new heap location is statically unknown. The heap environment does not change after heap allocation because the rest of the program does not refer to the new heap location by name.

Accordingly, when controlling transfers, the type checker matches the current environments with those of the target. The location environment of the target should have been fully instantiated. $\Gamma \Rightarrow \Gamma'$ requires that $\Gamma'$ be a subset of $\Gamma$. It will be appreciated that while some of the instruction typing rules described above are applicable for use with both stacks and heaps, a portion of rules may be used with only stacks or only heaps. For example, the i-load-p (40), i-store-p (41), and i-heapalloc (46) are only applicable to heaps, while i-store-concat (43) is only usable with stacks.

Exemplary Type Checking

The type checker of a compiler may check a program using the type system that includes one or more of the stack rules, the operand typing rules, and the instruction typing rules, as described above. For example, a program may consist of a heap H, a register bank R, a stack s, and a block body as the entry point. H is a partial function from heap locations to heap values. R is a partial function from registers to word-sized values. The stack s records values on the spine. It is either the empty stack "empty" or a concatenation of a word-sized value with a stack "w::s".

$$\text{heap value } v ::= \text{block} \langle w \rangle \tag{48}$$

$$\text{block block} ::= \forall[\Delta](\Gamma,\varsigma)b \tag{49}$$

$$\text{block body } b ::= \text{ins};b \mid \text{jump } o \tag{50}$$

$$\text{heap } H ::= p_1 \mapsto v_1, \ldots, p_n \mapsto v_n \tag{51}$$

$$\text{reg bank } R ::= r_1 \mapsto w_1, \ldots, r_n \mapsto w_n \tag{52}$$

$$\text{stackvalue } s ::= \text{empty} \mid w::s \tag{53}$$

$$\text{program } P ::= (H,R,s,b) \tag{54}$$

As shown above, a heap value v is either a code block "block" or a heap word "$\langle w \rangle$". A code block "$\forall[\Delta](\Gamma,\varsigma)b$" describes the precondition $\forall[\Delta](\Gamma,\varsigma)$ and its body b. The block body is a sequence of instructions that ends with a jump instruction. Only variables in $\Delta$ can appear free in $\Gamma$, $\varsigma$, and the block body.

The program P=(H, R, s, b) is well-formed (illustrated by the judgment $\varsigma \vdash P$) if H matches a heap environment $\Psi$, R matches a register file $\Gamma$, s matches a stack type $\varsigma$, and b is well-formed under $\Psi$, $\Gamma$, and $\varsigma$. The notion "•" means empty environments. Accordingly, this may be represented as:

$$\text{m-tp} \quad \frac{\vdash H:\Psi\cdot;\ \Psi \vdash s:\varsigma\cdot;\ \Psi \vdash R:\Gamma\cdot;\ \Psi;\ \Gamma;\ \varsigma \vdash b}{\vdash (H, R, s, b)} \tag{55}$$

Also, a heap H matches a heap environment $\Psi$ if they have the same domain and each heap value in H has the corresponding type in $\Psi$ (h-tp). Matching a register bank with a register file is defined similarly (g-tp), as shown below:

$$\text{h-tp} \quad \frac{\Psi = \{\ldots, p \mapsto \tau, \ldots\} \quad H = \{\ldots, p \mapsto v, \ldots\};\ \ldots\cdot;\ \Psi \vdash v:\tau \ldots}{\vdash (H:\Psi)} \tag{56}$$

$$\text{g-tp} \quad \frac{\Gamma = \{\ldots, r \mapsto \tau, \ldots\} \quad R = \{\ldots, r \mapsto w, \ldots\};\ \ldots \Delta;\ \Psi;\ \cdot \vdash w:\tau \ldots}{\Delta;\ \Psi \vdash R:\Gamma} \tag{57}$$

Moreover, a stack value s matches a stack type $\varsigma$ if all the locations on the spine have the corresponding type in $\varsigma$ (s-base and s-concat) and $\varsigma$ contains only aliased locations to heap pointers (s-alias) and to stack locations on the spine (s-imp).

$$\text{s-base} \quad \overline{\Delta;\ \Psi \vdash \text{empty}:(\text{base}:\text{Empty})} \tag{58}$$

$$\text{s-concat} \quad \frac{\Delta;\ \Psi \vdash s:(l:\varsigma)\Delta;\ \Psi \cdot \vdash w:\tau;}{\Delta;\ \Psi \vdash w::s:(\text{next}(l):\tau::l:\sigma)} \tag{59}$$

$$\text{s-alias} \quad \frac{\Delta;\ \Psi,\ \{p \mapsto \text{HeapPtr}(r)\vdash s:(l:\sigma)\}}{\Delta;\ \Psi,\ \{p \mapsto \text{HeapPtr}(r)\} \vdash s:(l:(\sigma \wedge \{p:\tau\}))} \tag{60}$$

$$\text{s-imp} \quad \frac{\Delta;\ \Psi \vdash s:\varsigma\ \varsigma \Rightarrow \varsigma'}{\Delta;\ \Psi \vdash s:\varsigma'} \tag{61}$$

To type check a block body, the type checker may check the instructions in order (b-ins) until it reaches the jump instruction (b-jump). The unpack instruction "($\eta$, r)=unpack(o)" generally requires o have a heap pointer type (b-unpack). The rule introduces a fresh location variable $\eta$ to $\Delta$, assigns r a singleton type Ptr($\eta$), and updates the stack type to contain $\eta$.

$$\text{b-ins} \quad \frac{\Delta;\ \Psi \vdash (\Gamma:\varsigma)\{\text{ins}\}(\Gamma';\ \varsigma')\Delta;\ \Psi;\ \{\text{ins}\}(\Gamma';\ \varsigma')}{\Delta;\ \Psi;\ \Gamma;\ \varsigma \vdash \text{ins};\ b} \tag{62}$$

$$\text{b-jump} \quad \frac{\Delta;\ \Psi \vdash o:\forall\ [](\Gamma',\ \varsigma')\Gamma \Rightarrow \Gamma'\ \varsigma \Rightarrow \varsigma'}{\Delta;\ \Psi;\ \Gamma;\ \varsigma \vdash \text{jump } o} \tag{63}$$

$$\text{b-unpack} \quad \frac{\Delta; \Psi; \Gamma \vdash o:HeapPtr(\tau) \; r \neq sp \; \eta \notin \Delta}{\Delta; \Psi; \Gamma; l:\sigma \vdash o(\eta, r) = \text{unpack}(o)} \quad (64)$$

Similarly, a block in the program is well-formed if under the heap environment and the specified precondition, the block body type-checks.

$$\text{block-tp} \quad \frac{\Delta; \Psi; \Gamma; \varsigma \vdash b}{\Psi \vdash \forall [\Delta](\Gamma, \varsigma)b} \quad (65)$$

Furthermore, the compilation of the exemplary source code swap function into an assembly language code swap function that incorporates the type system described above may also be illustrated. For example, given the swap function in the source code:

```
int swap(int *s x, int *s y){
    int t = 0;
    int t' = 0;
    t = !x;
    t' = !y;
    x := t';
    y := t;
    return 0;
}
```

The swap function may be translated into the following instructions:

```
∀[η_x,η_y,η0,ρ](Γ,ς)
    mov r_fp, sp
    mov r_1, 0              ; r_1 = 0;
    ladd sp,-4
    store [sp + 0], r_1     ; push r_1 (for t')
    mov r_1, 0              ; r_1 = 0;
    ladd sp,-4
    store [sp + 0], r_1     ; push r_1 (for t)
    load r_1, [r_fp + 0]    ; r_1 = x
    load r_1, [r_1 + 0]     ; r_1 = [r_1]
    store [r_fp + (-8)], r_1 ; t = r_1 (t =!x)
    load r_1, [r_fp + 4]    ; r_1 = y
    load r_1, [r_1 + 0]     ; r_1 = [r_1]
    store [r_fp + (-4)], r_1 ; t' = r_1 (t' =!y)
    load r_1, [r_fp + 0]    ; r_1 = x
    load r_2, [r_fp + (-4)] ; r_2 = t'
    store [r_1 + 0], r_2    ; [r_1] = r_2 (x := t')
    load r_1, [r_fp + 4]    ; r_1 = y
    load r_2, [r_fp + (-8)] ; r_2 = t
    store [r_1 + 0], r_2    ; [r_1] = r_2 (y := t)
    ladd sp, 16             ; pop t, t', x, y
    mov r_1, 0              ; r_1 = 0
    ladd sp,-4
    store [sp + 0], r_1     ; push r_1
    jump r_ra               ; jump r_ra
``` where $\Gamma = sp \mapsto Ptr(next^2(\eta_0))$, $r_{ra} \mapsto \forall [\;](sp \mapsto Ptr(next(\eta_0))$, $next(\eta_0):int:\eta_0:\rho)$ and $\varsigma = next^2(\eta_0):Ptr(\eta_x)::next(\eta_0):Ptr(\eta_y)::\eta_0:(\rho \wedge \{\eta_x:int\} \wedge \{\eta_y:int\})$.

It will be appreciated while the type checker may implement the various rules described above to perform the type checking of assembly code, the rules may be written in other forms for implementation by the type checker. The actual syntax and format of the rules are dependent on the notation systems employed to represent the structures of stacks and/or heaps. Therefore, the syntax and format of the rules described above are exemplary and not intended to be construed as a limitations.

Figure 3:
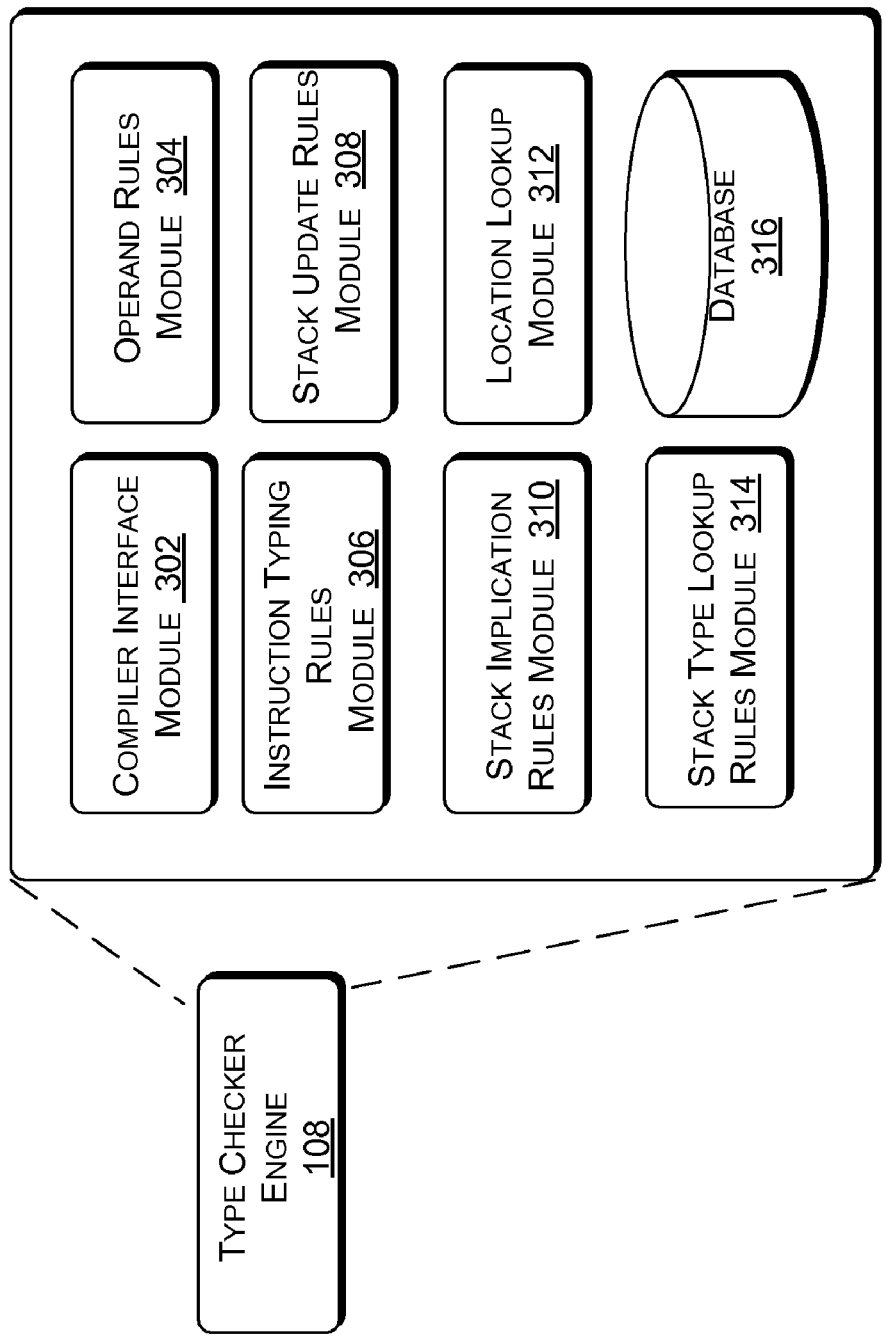
FIG. 3 is a block diagram illustrating selected components of an exemplary type checking engine that is configured to type check a typed assembly language code, in accordance with various embodiments implementing simple stack types (SST).

FIG. 3 illustrates selected components of an exemplary type checking engine 108 that is configured to type check a typed assembly language, in accordance with various embodiments for implementing simple stack types (SST). The components may be in the form of modules. Further, the modules may include routines, programs, objects, components, and data structures that perform particular tasks or implement particular abstract data types. The selected components of the type checking engine 108 may include, but are not limited to, a compiler interface module 302, an operand rules module 304, an instruction typing rules module 306, a stack update rules module 308, a stack implication rules module 310, a location lookup module 312, and a stack type lookup rules module 314. The type checking engine 108 may also include a database 316.

The compiler interface module 302 may retrieve one or more assembly language instructions from a compiler, such as the compiler 106, as the compiler transforms source code into assembly language code. In one instance, the source code may include the code 104. Moreover, the compiler interface module 302 may also be employed to return one or more type checked assembly language instructions to the compiler.

The operand rules module 304 may be configured to implement the operand typing rules, as described in FIG. 1, to one or more retrieved assembly language instructions. The instruction typing rules module 306 is configured to implement the instruction typing rules, as described in FIG. 1, to the one or more retrieved assembly language instructions. The stack update rules module 308 is configured to implement stack update rules, as described in FIG. 1, to the one or more retrieved assembly language instructions. Similarly, the stack implication rules module 310 is configured to implement stack implication rules, as described in FIG. 1, to the one or more retrieved assembly language instructions.

The location lookup module 312 is configured to implement the location lookup rules, as described in FIG. 1, to the one or more retrieved assembly language instructions. The stack type lookup module 314 is configured to implement the stack type lookup rules, as described in FIG. 1, to the one or more retrieved assembly language instructions. Accordingly, each of the rule modules 304-314 may be configured with the ability to determine the appropriate rule to apply to the one or more retrieved assembly language instructions. It will be appreciated the various rules implemented by the rule modules 304-314 may be stored in the database 316.

Exemplary Process

Figure 4:
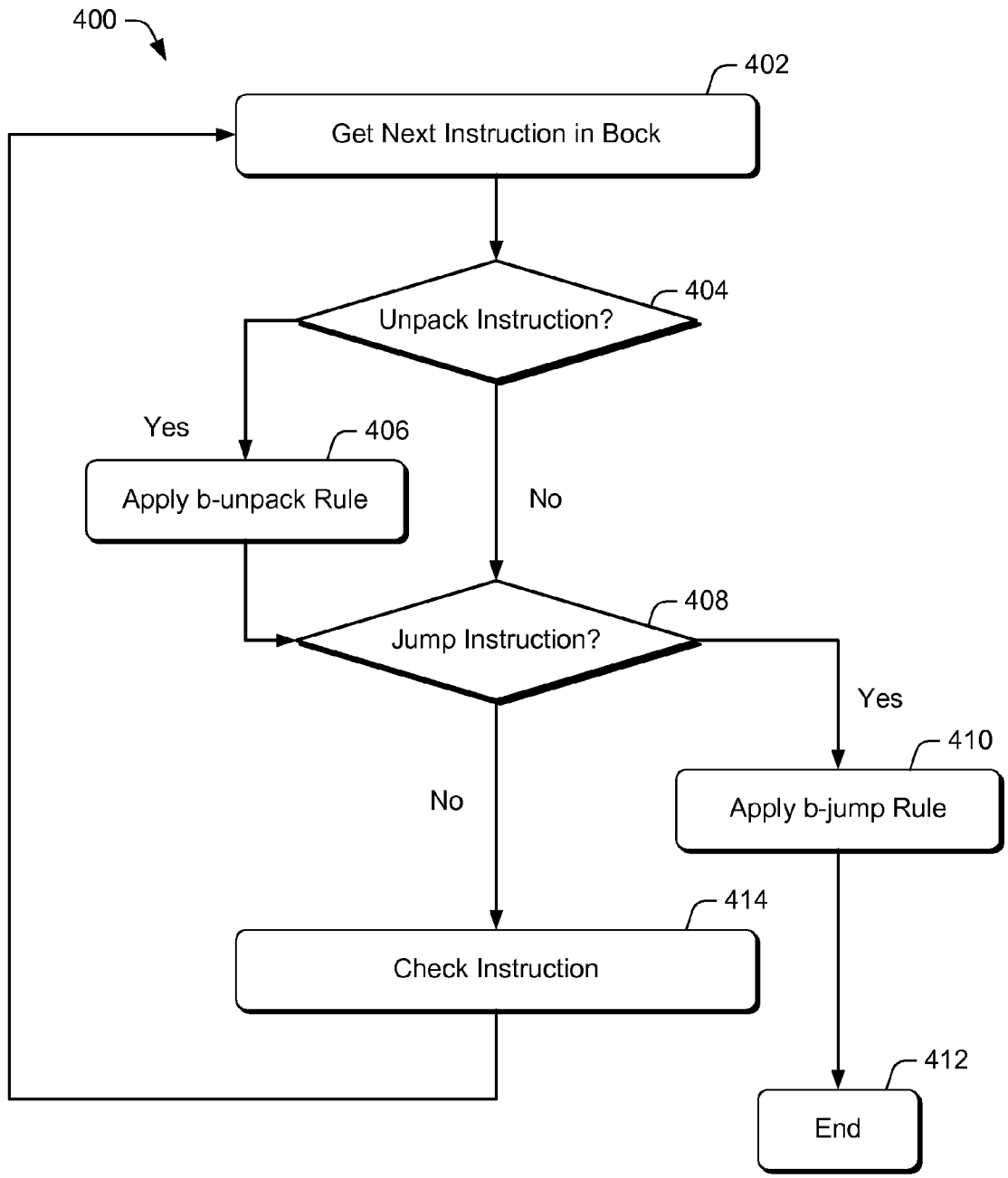
FIG. 4 is a flow diagram illustrating an exemplary process for performing type checking on instructions in a block of typed assembly language code, in accordance with various embodiments for implementing simple stack types (SST).
Figure 5:
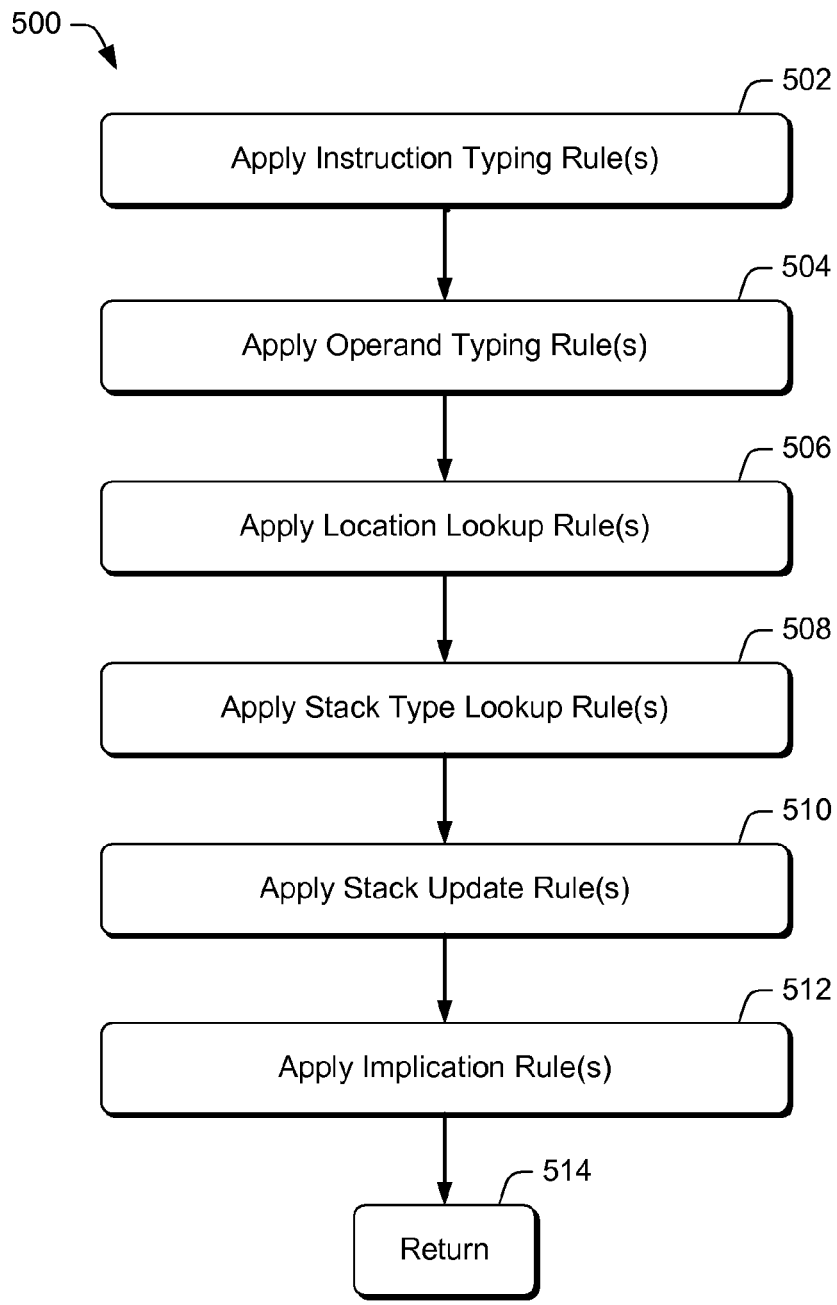
FIG. 5 is a flow diagram illustrating an exemplary process for type checking a particular typed assembly language instruction, in accordance with various embodiments for implementing simple stack types (SST).

FIGS. 4 and 5 illustrate exemplary processes for performing type checking on instructions. Each of the exemplary processes is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process is described with reference to the exemplary type checker engine 108 in FIG. 1, although it may be implemented in other system architectures.

FIG. 4 illustrates an exemplary process 400 for performing type checking on instructions in a block of typed assembly language code, in accordance with various embodiments for implementing simple stack types (SST). At block 402, the type checker engine 108 may obtain an instruction from a block in a program. The instruction may be an assembly language instruction. At decision block 404, the type checker engine 108 may determine whether the instruction is an unpack instruction. If the type checker engine 108 determines that the instruction is an unpack instruction, ("yes" at decision block 404), the type checker engine 108 may apply one or more unpacking rules to the instruction at block 406. For instance, the type checker engine 108 may apply the b-unpack rule (64), as described with respect to FIG. 1. Once the one or more unpack rules are applied to the instruction, the process 400 may continue to the block 408. However, if the type checker engine 108 determines that the instruction is not an unpack instruction ("no" at decision block 404), the process 400 may proceed directly to block 408.

At block 408, the type checker engine 108 may determine whether the instruction is a jump instruction. If the type checker engine 108 determines that the instruction is a jump instruction, ("yes" at decision block 408), the type checker engine 108 may apply a jump rule at block 410. In one embodiment, the type checker engine 108 may apply the b-jump rule (63), as described with respect to FIG. 1, to the instruction. Following the application of the jump rule to the instruction at block 410, the process 400 may terminate at block 412.

However, if the type checker engine 108 determines that the instruction is not a jump instruction ("no" at decision block 408), the process 400 may proceed to block 414. At block 414 the type checker engine 108 may apply one or more rules to type check the instruction. Accordingly to various embodiments, the one or more rules are configured to ensure that the instruction is well-typed. In other words, the one or more rules ensure that the one or more words operated on by the instruction are of the proper types, and the operation does not invalidate the types of the words. The application of one or more rules by the type checker engine 108 is further described in FIG. 5. Once the instruction is type checked at the block 414, the process 400 may loop back to block 402 so that the type checking of additional instructions may be implemented.

FIG. 5 illustrates an exemplary process 500 for type checking a particular instruction during compilation, in accordance with various embodiments for implementing simple stack types (SST). FIG. 5 further explains block 412 of the process 400. At block 502, the type checker engine 108 may apply one or more instruction typing rules to an instruction, such as an instruction described in FIG. 4. In one instance, the one or more instruction typing rules may include the instruction typing rules (36)-(47), as described with respect to FIG. 1. At block 504, the type checker engine 108 may apply one or more operand rules to the instruction. In one example, the type checker engine 108 may apply the operand rules (19)-(26), as described with respect to FIG. 1.

At block 506, the type checker engine 108 may apply one or more location look up rules to the instruction. For example, the type checker engine 108 may apply the location look up rules (31)-(32), as described with respect to FIG. 1. At block 508, the type checker engine 108 may apply one or more stack type look up rules to the instruction. For instance, the type checker engine 108 may apply the s-lookup rule (33), as described with respect to FIG. 1.

At block 510, the type checker engine 108 may apply one or more stack update rules to the instruction. For instance, the type checker engine 108 may apply the stack update rules (34)-(35), as described with respect to FIG. 1. Finally, at block 512, the type checker engine 108 may apply one or more stack implication rules to the instruction. For instance, the type checker engine 108 may apply the stack implication rules (3)-(10), as described with respect to FIG. 1. Once the one or more rules have been applied, the process 500 may return to the block 412 of the process 400 at block 514.

Exemplary Computing Environment

Figure 6:
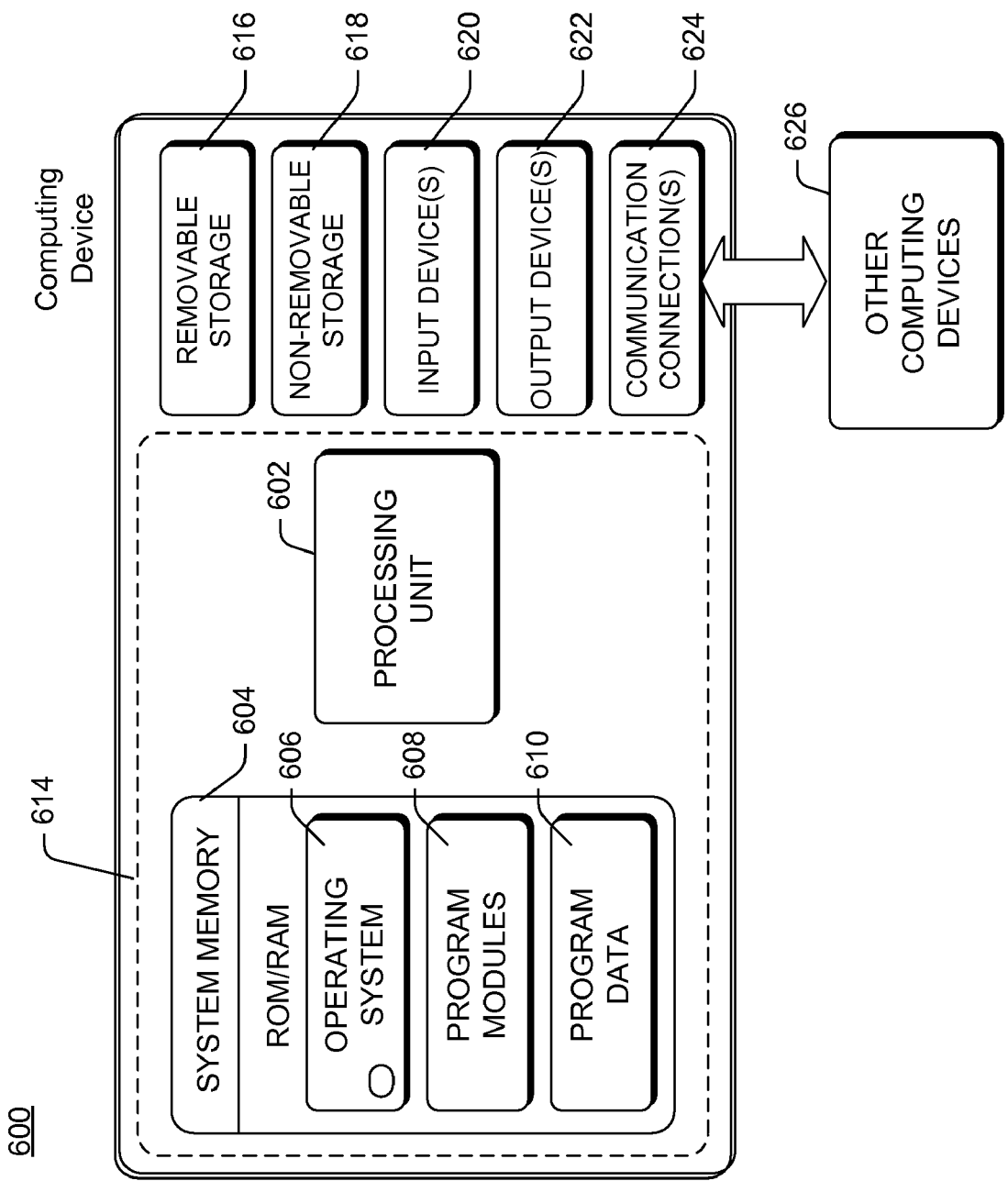
FIG. 6 is a block diagram illustrating a representative computing device. The representative computing device may be used to implement a compiler, the compiler including a type checking mechanism that employs simple stack types (SST) in accordance with various embodiments.

FIG. 6 illustrates a representative computing device 600 that may be used to implement a type checker that uses the type system described above. However, it will readily appreciate that the various embodiments of the type checking techniques and mechanisms may be implemented in other computing devices, systems, and environments. Accordingly, the computing device 600 shown in FIG. 6 is only one example of a computing device and is not intended to suggest any limitation as to the scope of use or functionality of the computer and network architectures. Neither should the computing device 600 be interpreted as having any dependency or requirement relating to any one or combination of components illustrated in the example computing device.

In a very basic configuration, computing device 600 typically includes at least one processing unit 602 and system memory 604. Depending on the exact configuration and type of computing device, system memory 604 may be volatile (such as RAM), non-volatile (such as ROM, flash memory, etc.) or some combination of the two. System memory 604 typically includes an operating system 606, one or more program modules 608, and may include program data 610. The operating system 606 includes a component-based framework 612 that supports components (including properties and events), objects, inheritance, polymorphism, reflection, and provides an object-oriented component-based application programming interface (API), such as, but by no means limited to, that of the .NET™ Framework manufactured by Microsoft Corporation, Redmond, Wash. The device 600 is of a very basic configuration demarcated by a dashed representation 614. Again, a terminal may have fewer components but will interact with a computing device that may have such a basic configuration.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by removable storage 616 and non-removable storage 618. Computer storage media may include volatile and nonvolatile, removable and non-removable media implemented in any method or technology for storage of information, such as computer readable instructions, data structures, program modules, or other data. System memory 604, removable storage 616 and non-removable storage 618 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 620 such as keyboard, mouse, pen, voice input device, touch input device, etc. Output device(s) 622 such as a display, speakers, printer, etc. may also be included. These devices are well know in the art and are not discussed at length here.

Computing device 600 may also contain communication connections 624 that allow the device to communicate with other computing devices 626, such as over a network. These networks may include wired networks as well as wireless networks. Communication connections 624 are one example of communication media. Communication media may typically be embodied by computer readable instructions, data structures, program modules, etc.

It is appreciated that the illustrated computing device 600 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A method, comprising:
   receiving a low level language instruction that accesses a word in a memory, the word having a first type and the memory including one of a stack or a heap;
   labeling positions in each of the stack or the heap as one or more specified positions and one or more unspecified positions;
   assigning a second type to the memory, the second type including the first type, the word being at one of the one or more unspecified positions or the one or more specified positions; and
   determining whether the low level language instruction is well-typed by applying one or more rules to the instruction and to the second type.

2. The method of claim 1, wherein the one or more rules include a first stack implication rule for adding an alias to one of the stack and the heap.

3. The method of claim 1, wherein the one or more rules include a second stack implication rule for dropping an alias from one of the stack and the heap.

4. The method of claim 1, wherein the one or more rules include a third stack implication rule for expanding an alias of one of the stack and the heap.

5. The method of claim 1, wherein the one or more rules include a fourth stack implication rule for merging two alias of one of the stack and heap.

6. The method of claim 1, wherein the one or more rules include a first stack pointer rule $$\frac{r \neq sp \ \Gamma' = \Gamma[r \mapsto \tau]}{\vdash (\Gamma, \varsigma)\{r \leftarrow \tau\}(\Gamma', \varsigma)},$$

where $\Gamma$ represents an original register file, $\varsigma$ represents the stack, $\Gamma'$ represents a transformed $\Gamma$, r represents a register, $\tau$ represents the type of the word, and sp represents a stack pointer.

7. The method of claim 1, wherein the one or more rules include a second stack pointer rule $$\frac{\vdash \text{Resize}(l, \varsigma) = \varsigma' \ \Gamma' = \Gamma[sp \mapsto Ptr(l)]}{\vdash (\Gamma, \varsigma)\{sp \leftarrow Ptr(l)\}(\Gamma', \varsigma')},$$

where $\Gamma$ represents an original register file, $\varsigma$ represents the stack, $\Gamma'$ and $\varsigma'$ respectively represents a transformed $\Gamma$ and a transformed $\varsigma$, sp represents a stack pointer, l represents a location in the memory, and Ptr(l) represents a pointer to l.

8. The method of claim 1, wherein the one or more rules include one of a strong stack update rule and a weak stack update rule.

9. The method of claim 1, wherein the one or more rules include an instruction typing rule that verifies that an instruction that moves a stack pointer along the stack according to an integer value is well-typed.

10. The method of claim 1, wherein the one or more rules include an instruction typing rule that verifies that one of an instruction that loads the word from a heap location or an instruction that stores the word into the heap location is well-typed, the heap location being one of the one or more unspecified positions or the one or more specified positions.

11. The method of claim 1, wherein the one or more rules include an instruction typing rule that verifies that one of an instruction that loads the word from a stack location or an instruction that stores the word into the stack location is well-typed, the stack location being one of the one or more unspecified positions or the one or more specified positions.

12. The method of claim 1, wherein the one or more rules include an instruction typing rule that verifies that an instruction that one of loads or stores an alias of the word in the memory is well-typed.

13. The method of claim 1, wherein the one or more rules include an instruction typing rule that verifies that an instruction that allocates the word to the heap is well-typed.

14. The method of claim 1, wherein the one or more rules include an instruction typing rule that verifies that a jump instruction is well-typed.

15. The method of claim 1, wherein the one or more rules include an unpack rule that verifies that an instruction that unpacks a heap location is well-typed.

16. A computer readable medium having computer-executable commands that, when executed, perform acts comprising:
   receiving a low level language instruction from a program block, the instruction include a word having a first type, the word being stored at a position in one of a stack or a heap of a memory, each of the stack or heap includes one or more specified positions and one or more unspecified positions;
   assigning a second type to the memory that includes the first type; and
   determining whether the low level language instruction is well-typed by applying one or more rules to the instruction and to the second type.

17. The computer-readable medium of claim 16, further comprising commands that perform acts comprising:
   applying one or more instruction operand typing rules to the instruction;
   applying one or more location lookup rules to the stack;

applying one or more stack type lookup rules to the stack;
applying one or more stack update rules to the stack; and
applying one or more stack implication rules to the stack using the representation.

18. The computer-readable medium of claim 16, further comprising a command that performs the act of applying an unpack rule to the instruction.

19. The computer-readable medium of claim 16, further comprising a command that performs the act of applying a jump rule to the instruction.

20. A data structure, comprising:
a memory that includes one of a stack or a heap, each of the stack or heap further comprising one or more specified positions and one or more unspecified positions;
a first type assigned to a word, the word being stored in one of the one or more unspecified positions or the one or more specified positions; and
a second type assigned to the memory, the second type including the first type.

* * * * *

UNITED STATES PATENT AND TRADEMARK OFFICE
CERTIFICATE OF CORRECTION

| | | |
|---|---|---|
| PATENT NO. | : 7,975,121 B2 | Page 1 of 1 |
| APPLICATION NO. | : 12/119151 | |
| DATED | : July 5, 2011 | |
| INVENTOR(S) | : Juan Chen et al. | |

It is certified that error appears in the above-identified patent and that said Letters Patent is hereby corrected as shown below:

IN THE CLAIMS:

In column 18, line 14, in Claim 7, delete "ç" and insert -- ç' --, therefor.

Signed and Sealed this
Twenty-third Day of August, 2011

David J. Kappos
*Director of the United States Patent and Trademark Office*